United States Patent
Grosch et al.

(10) Patent No.: US 6,822,200 B1
(45) Date of Patent: Nov. 23, 2004

(54) METHOD AND A SYSTEM FOR CONTROLLING A HEATING PLANT

(75) Inventors: Christian Grosch, Dr. Holme vei, N-0787, Oslo (NO); Jan Grosch, deceased, late of Oslo (NO); by Lilian Grosch, legal representative, Oslo (NO)

(73) Assignee: Christian Grosch, Oslo (NO)

( * ) Notice: Subject to any disclaimer, the term of this patent is extended or adjusted under 35 U.S.C. 154(b) by 0 days.

(21) Appl. No.: 09/980,842

(22) PCT Filed: Jun. 5, 2000

(86) PCT No.: PCT/NO00/00195

§ 371 (c)(1),
(2), (4) Date: May 22, 2002

(87) PCT Pub. No.: WO00/77588

PCT Pub. Date: Dec. 21, 2000

(30) Foreign Application Priority Data

Jun. 11, 1999 (NO) .......................................... 19992886

(51) Int. Cl.$^7$ ................................................ H05B 3/02
(52) U.S. Cl. ........................ 219/477; 219/212; 219/213; 219/528; 219/549
(58) Field of Search ................................ 219/477, 211, 219/212, 213, 217, 506, 528, 529, 544, 545, 549; 392/425, 432, 435

(56) References Cited

U.S. PATENT DOCUMENTS

| | | | | |
|---|---|---|---|---|
| 5,591,365 A | * | 1/1997 | Shields ........................ 219/213 |
| 5,986,237 A | * | 11/1999 | Sterling et al. ............. 219/213 |
| 6,166,352 A | * | 12/2000 | Turton ......................... 219/213 |
| 6,225,600 B1 | * | 5/2001 | Burris ......................... 219/213 |
| 6,278,085 B1 | * | 8/2001 | Abukasm ..................... 219/213 |
| 6,348,673 B2 | * | 2/2002 | Winters ....................... 219/213 |
| 6,479,797 B1 | * | 11/2002 | Yanagimoto et al. ....... 219/213 |

FOREIGN PATENT DOCUMENTS

| | | |
|---|---|---|
| DE | 31 43 237 A1 | 5/1983 |
| DE | 197 19 226 C1 | 11/1998 |
| DE | 197 32 295 A1 | 2/1999 |
| GB | 2 153 554 A | 8/1985 |

* cited by examiner

*Primary Examiner*—Fadi H. Dahbour
(74) *Attorney, Agent, or Firm*—Rothwell, Figg, Ernst & Manbeck, p.c.

(57) ABSTRACT

A method for controlling a heating plant as well as a control system for such a plant. More specifically the invention relates to the control of a heating plant adapted for local heating of surfaces to avoid ice and snow on such surfaces, and in particular controlling street heating plant or point heating plants (for rails), provided with one or several heating elements; so that a low power consumption is obtained. The control system is provided with at least one remotely operated unit (4) adapted to be controlled in such a manner that consumed energy is controlled in dependence of meteorological data representing present and anticipated temperatures and amounts of precipitation. The plant may also include one main station or weather station (10) which is influenced both by signals transmitted at a time depending of anticipated meteorological conditions and signals stating detected temperature and humidity at the weather station itself, and at least one satellite station (7) controlled by remote control only, e.g., via a modem, and then by a signal (16) transmitted form the weather station (10).

11 Claims, 4 Drawing Sheets

METHOD AND A SYSTEM FOR CONTROLLING A HEATING PLANT

BACKGROUND OF THE INVENTION

1. Field of the Invention

Figure 1:
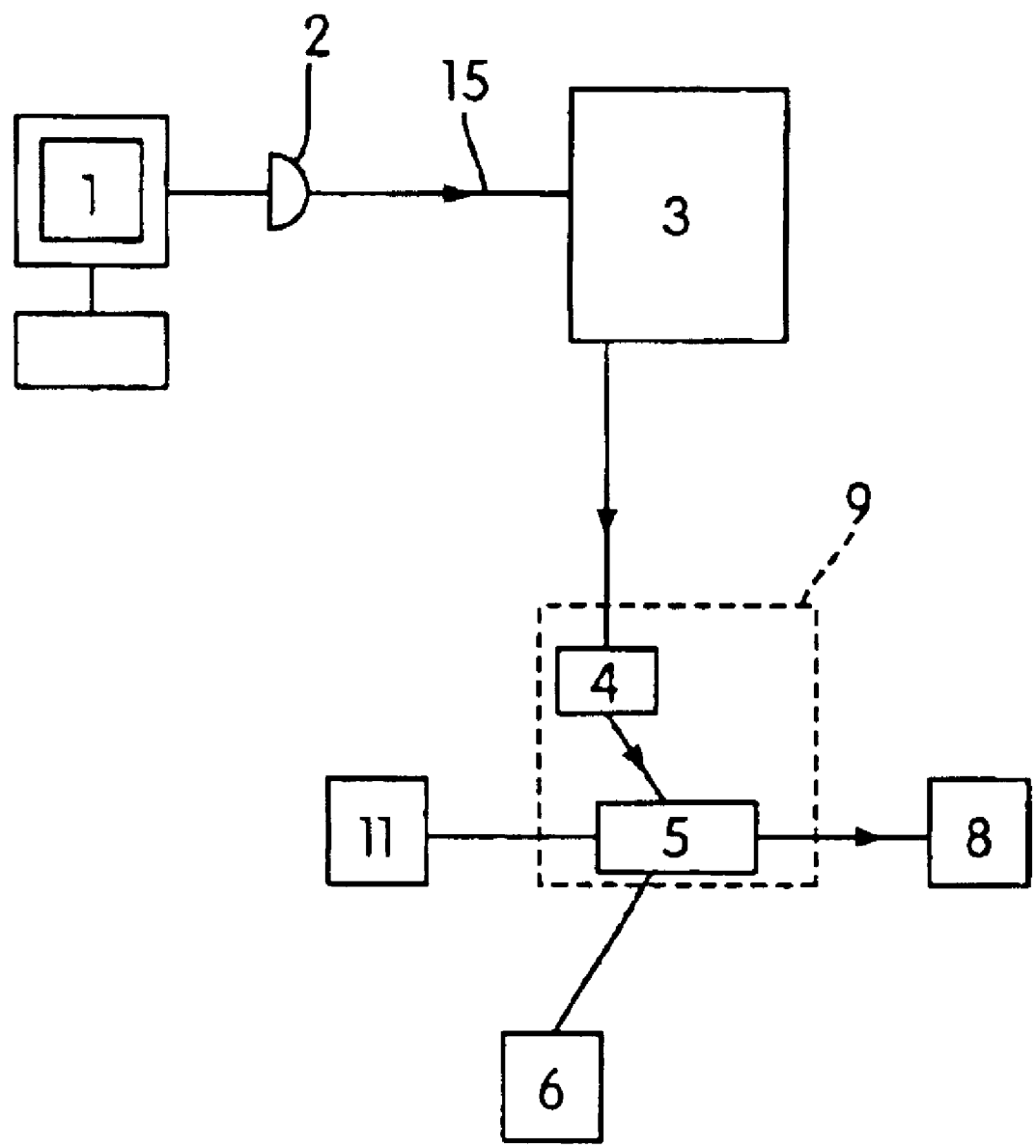

A method for controlling a heating plant adapted for local heating of a surface to avoid ice and snow on this surface, in such a manner that a low energy consumption is obtained. The invention also relates to a control system for such a heating plant.

The invention especially relates to controlling of a heating plant in such a manner that surfaces provided with heating elements heated by energy supplied from e.g. electrical energy sources or from a heated fluid are considered. The invention is substantially, but not exclusively used for local heating of areas with traffic such as streets or sidewalks or selected parts of such areas.

In the following specification a heating plant adapted to heat a part of a street by means of electrical energy substantially will be described, however, this is only an example as the invention also relates to plants heating other objects, such as points for traffic on tracks or rails and heating plants using other forms of energy than electricity, e.g. heating flows of fluids or combinations of such plants.

2. Description of the Background Art

Previously, many kinds of street heating plants are known adopted for the melting of snow. The simplest plants are built as an electric heating loop provided below the surface where an area without snow and ice is desired. Such a plant is, in its most simple embodiment, made without any control system as it is provided only with an "on"/"off" switch which may be operated manually, and then the plant is switched "on" during cold periods when it is desirable that snow and ice shall melt and flow away, while the plant is switched "off" during warmer periods or when there is no precipitation in the shape of snow. Accordingly such plants have to be supervised constantly by a person present on the site and is technical spoken without any real control system.

The above mentioned simple and manually controlled plants will necessarily result in high operating and energy costs, both as they require constant monitoring and as the users sometimes will forget to switch the plant "off" when required. Accordingly, automatic plants have been developed provided with different kinds of detectors controlling the switching "on" and switching "off" operations. Here only one plant should be mentioned, described in Norwegian patent application No. 92.3375 filed by the same applicant, and here an automatic plant is shown using a temperature detector having two thermostats or relays, and also a humidity detector in the surface of a street. This detector will, together with the relays and electronic circuits adapted therefore, supply energy to the heating element only when precipitation and a surface temperature below zero occurs simultaneously. Then the plant will be switched "on" only when precipitation takes place in periods with a temperature below zero and be switched "off" both when the temperature rise above a predetermined lower threshold value and also when no precipitation is detected (no humidity detected).

Even when plants of the latter type is considered the energy consumption often will be higher than required. This depends especially on two conditions:

1) The ground or surface temperature ought to be maintained on a rather high "preparedness level" during cold and dry periods. Otherwise the surface would, without any kind of energy supply during such periods, be extremely cooled down, and if snow should start falling after such a long lasting cold period it would take a very long time before the surface is sufficiently heated from its extremely low temperature so that melting of snow will start. Accordingly, long periods with slush would occur in the areal. By means of empiric experiments it has been found that such a "preparedness heating" of the surface during long lasting cold periods in many places will represent the highest portion of the energy consumption of such plants; in the area of the capital Oslo in Norway about 80%.

2) The users of such plants will often adjust the stand-by temperature upwards more than required to avoid that snow will build up in the first time of each new fall of snow. Such a "faulty setting" of the plant will give unnecessarily high working costs.

Another disadvantage with plants comprising heat detectors in the ground is that such detectors easily may be damaged by heavy traffic loads and therefore deactivated whereafter the control of the plant will be delusive. With a control system according to the present invention it will not be necessary to use temperature detectors to measure the earth temperature. Although existing plants comprising a detector for detecting the ground temperature may easily be re-designed to act according to the present invention, so that the thermostat for earth temperature may be removed or deactivated as its coupling temperature is adjusted below the existing temperature level. (In addition one or more relatively inexpensive components may be added to the circuit during such a re-designing process, as closer explained below).

Practical examinations have shown that the power consumption of a street heating plant may be reduced to less than the half by undertaking the control process according to the present invention. The economical advantages of such a solution will of course depend of the power price, but normally the additional costs of such a plant will be so low that the plant costs according to the invention will be saved after a short operating period.

SUMMARY OF THE INVENTION

The object of the present invention is to provide a method for optimal control of a heating plant in such a manner that the power consumption is as low as possible without giving long periods with snow, ice or slush on the site. The object also is to provide a control system which does not imply the disadvantages mentioned above, but which to the contrary results in a cost effective working of the heating plant without any local maintenance. The power consumption then may be reduced from approximately 400 kWh/m$^2$/year to about 150 kWh/m$^2$/year (an example valid for street heating plants in the Oslo-region in south Norway), without other changes than explained above.

In very cold regions having relatively small amounts of precipitation during the cold periods, much of the power consumption has so far been used to keep a high stand-by temperature to avoid troublesome amounts of slush, which will be the result if the plant is not switched "on" before a snowfall begins.

By using a method and a control system according to the below claims, these advantages may be obtained. As a principle it may be said that the invention is based on good and correct forecasts relating to anticipated temperatures and anticipated precipitation amounts in form of snow. With good forecasts a plant may be switched "off" during long lasting cold periods without precipitation, no matter how low the temperature is. Only when precipitation having the shape of snow has been included in the weather forecast it is required to switch the plant "on" and then at a determined period before the fall of snow starts. This time period may again be a function of the temperature at the moment, as the plant should be switched "on" well in time before the fall of snow starts, especially when the temperature is very low, to secure that a suitable start temperature is obtained before the beginning of the snowfall. If the temperature is close to 0° C. and has been at this level for a long period, the switching "on" of the plant may wait until the very beginning of the snowfall. In such a manner the duration of the time period from switching "on" of the plant until the snow begins to fall, may be determined dependent of the preceding temperature changes. A thermostat monitoring the earth temperature may then also be superfluous in the plant, which also will lead to reduction of the working costs.

All the above advantages and objects may be met by using a method or a control system according to the patent claims stated below.

BRIEF DESCRIPTION OF THE INVENTION

Figure 2:
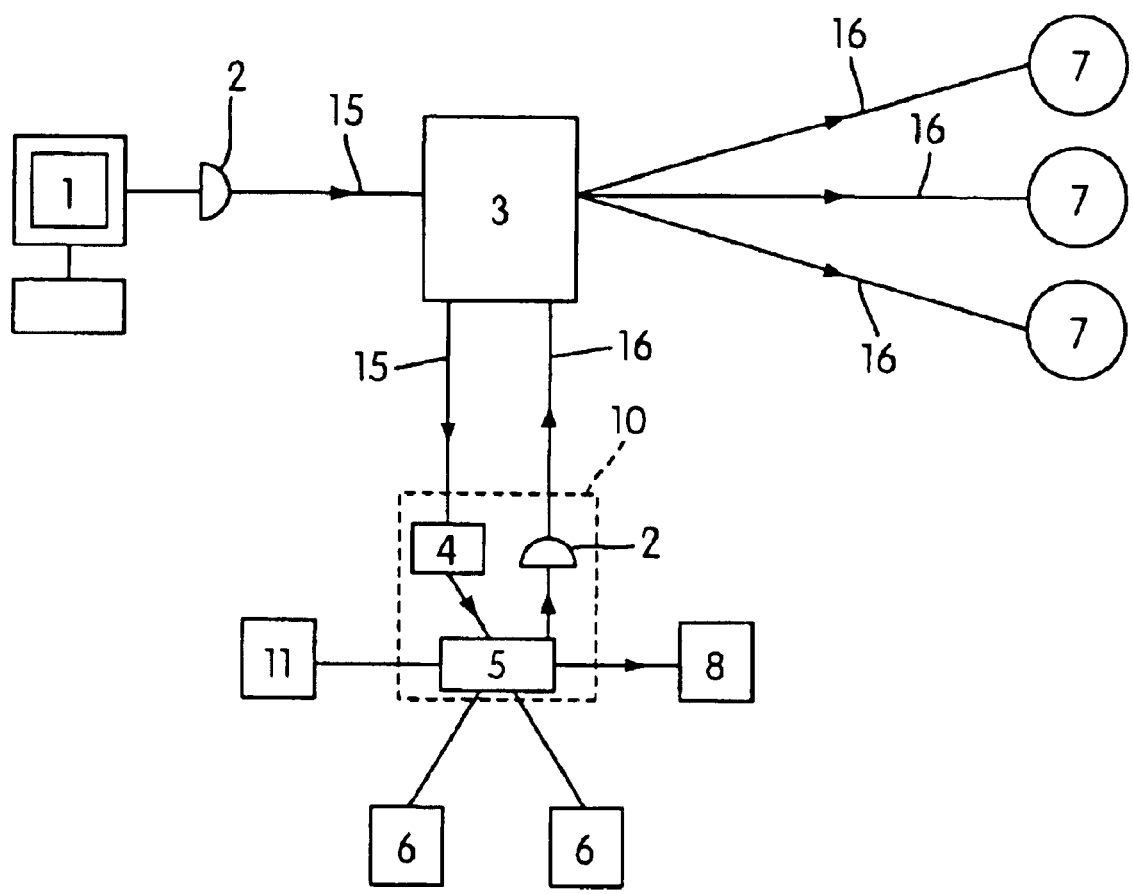
Figure 3:
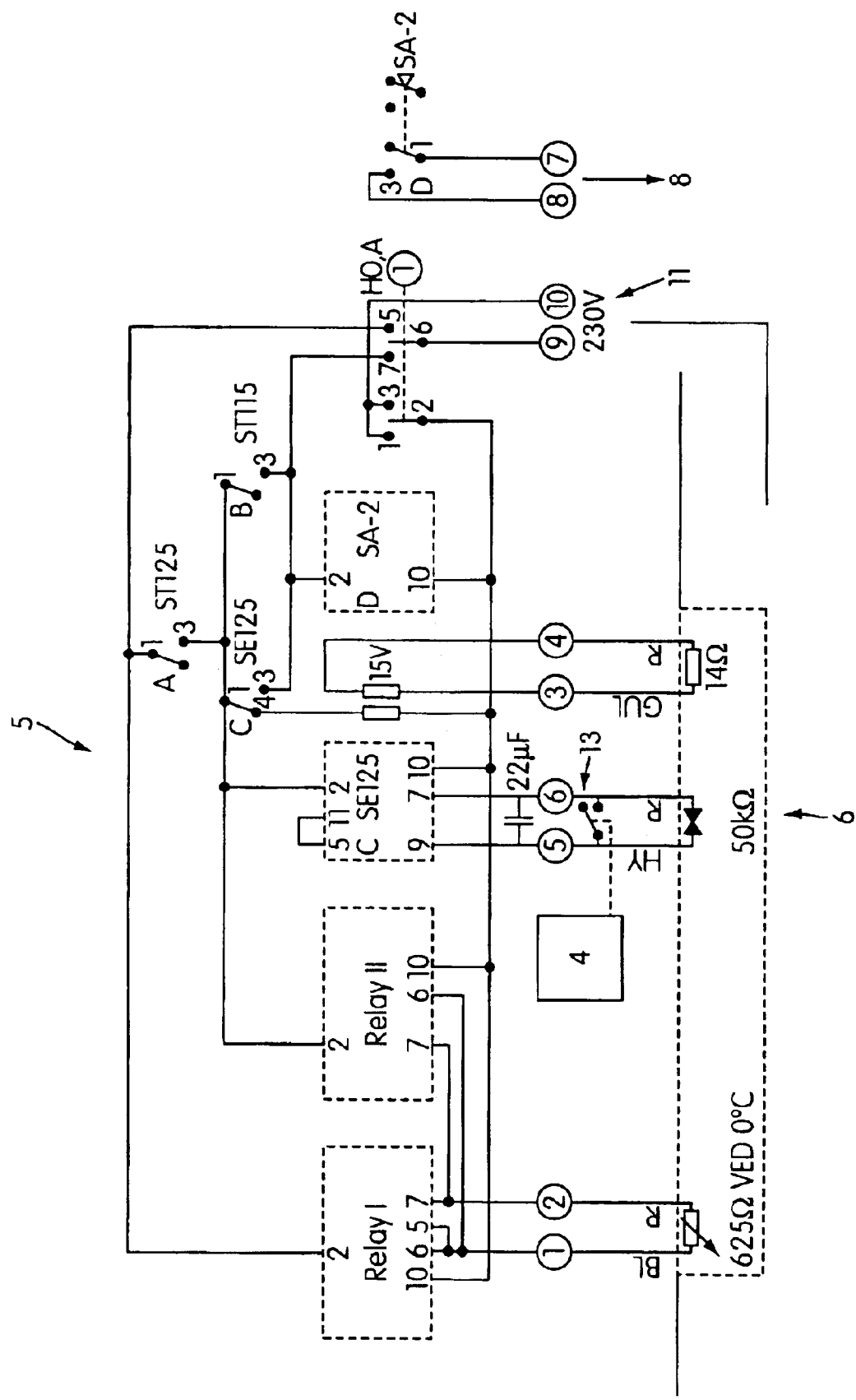
Figure 4:
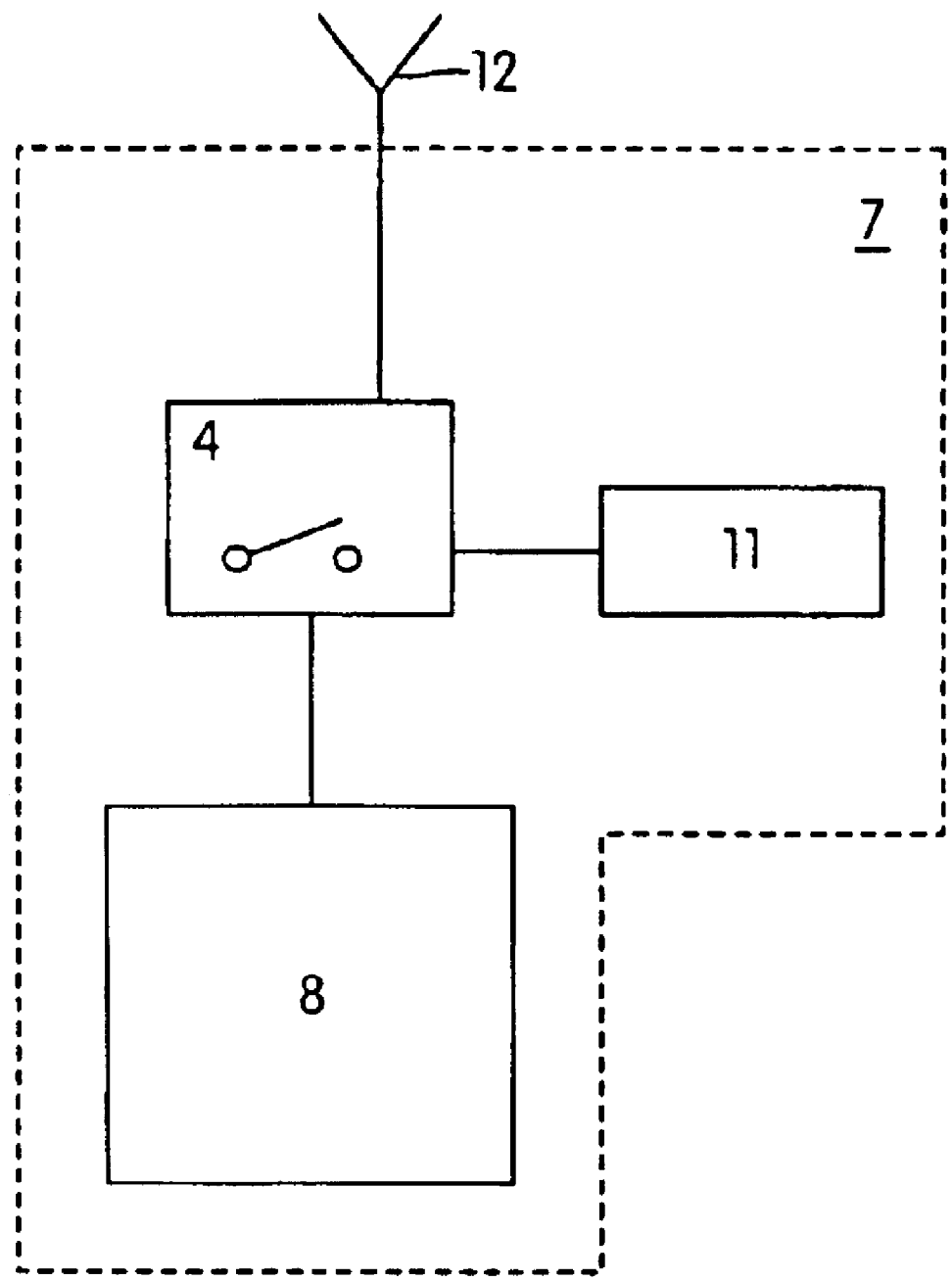

To get a better understanding of the invention it is referred to the specification describing some embodiments below, and in these examples the invention is explained with reference to a street heating plant with electrical power supply, and it is also referred to the accompanying drawings where:

FIG. 1 shows the control of one single local heat plant comprising a remote control unit, according to the present invention. The plant also comprises the required actuator circuits and interfaces, FIG. 2 shows a weather station or a reference plant which, according to the invention, is used as a weather station for several heating plants within a region with approximately equal weather conditions at all plants. The weather station is based on a control system according to FIG. 1, but is in addition, equipped to control a series of satellite stations having a simpler design, FIG. 3 shows how the central included in FIG. 1 and in FIG. 2 may be based on a previously known automatic control plant of the type "SNØOSTAT", as it is combined with a remotely operated unit 4 built up from one single "on"/"off" switch shunted by a local humidity detector 6, and FIG. 4 shows how a simpler satellite station may be constructed.

DETAILED DESCRIPTION OF THE INVENTION

It should already be mentioned that the embodiments shown as examples in the figures should not be considered as a limitation of the invention. Accordingly, these examples may be varied still further than stated here, though within the scope of the patent claims below. Further it should be mentioned that the described embodiments do not include all practical details which may be used to realize the invention, as the embodiments primarily aims at giving a description of the principle of the invention. However, the same reference numerals are used on all figures for similar units and elements undertaking the same function, even if the elements and units may have a somewhat different representation.

On the figures the following references are used:

1—A control exchange preferably built up as a computer such as a personal computer, comprises the exchange for automatic transmitting predetermined operating or activating signals 15, adapted for connecting the heating elements 8 to a power source 11. The signals are transmitted via modems 2 (or a similar transmitter/receiver) to the communication exchange 3.

2—A modem or (transceiver) adapted for transmitting/receiving of the activating signals 15.

3—A communication exchange for transmitting/retransmitting of an activating signal 15, possibly as a radio signal or a telecommunication signal, e.g. in a paging system for controlling a remote operated unit 4.

4—A remote operated unit e.g. including a controllable switch or a valve controlled by means of a radio signal or a similar telecommunication signal via a telecommunication network or a similar equipment.

5—A central in a weather station or in a local heating plant. This central may be specifically produced for such use or it may be a re-designed previously known control circuit (e.g. a SNØ0STAT), adapted to receive activating signals 15 and also to transmit such signals further to satellite stations 7, e.g. via a modem 2.

6—A humidity sensor arranged in the surface and used in weather station 10 (not necessarily in the satellite station 7).

7—Satellite station, i.e. a remote heating plant controlled by a local remote control unit, e.g. a remotely operated switch 4 in each single satellite station.

8—The heating element arranged at or in the surface which are to be maintained without snow or ice.

9—A local control system, used only for a local heating element 8.

10—An area control system also called a weather station, being used in common for a local heating plant and for one or more satellite stations 7 having their local heating plants, arranged in one single weather region.

Both 9 and 10 are above referred to as a control system. However, a complete control system according to the invention comprises also a control exchange 1, the communication central 3 and the communication paths with their modems and interfaces. The only components previously known are the quite local control plants comprising the units 5 (somewhat modified), 6, 8 and 11. The remaining components (comprising a quite new or a previously known re-designed exchange 5) are the elements in the new control system. These details are explained in more detail in the description below.

FIG. 1 refers to a local control plant according to the present invention, combined with an existing automatic heating plant. According to the invention an activating signal 15 may be transmitted from the control central 1. The communication exchange 3 may e.g. be a public exchange based on a paging plant, or any other exchange adapted to transmit the activating signal 15 to the heating elements 8 in question via a local control system 9 (e.g. a redesigned SNØOSTAT delivered by Jan Grosch AS). The new control or monitoring element in this circuit is a remotely operating unit, e.g. being shaped as a remotely controlling unit 4 including a remotely operated switch (or valve if a heated fluid is used as a power source 11) and the required activators, contactors and interfaces coupled thereto. When an electric street heating plant is considered, the remotely controlled unit 4 comprises a switch delivering a control signal for switching "on" the power source 11 (e.g. the electrical mains system) to the heating element 8 positioned within the street body, or in a different surface, at a suitable place. If the area is not a street area but rather a point for rails or tracks which has to be kept free for snow and ice, the heating element 8 may be arranged below or into the track element comprising the point. The remotely control unit 4 comprising a switch or a valve, is arranged on a suitable location between the heating element(s) 8 and the power source 11, no matter what kind of power source being used.

It should be pointed out that the switch in the remotely operating unit 4 normally does not switch the power used for heating, but only is a control element acting on contactors or actuators which in turn operates the power transmitting switch or valve assumed to right on FIG. 3.

The very control of the remotely operating unit 4 may take place by a wireless transmission of an activating signal 15 via suitable transceivers 2 (or possibly via aerials 12, as assumed in FIG. 4). The signal transmission may also take place via electrical or fibre optical cables, and may then in a manner known per se, be superimposed on voltages in the regular electrical mains network. As transmitter and receiver 2 may be built in numerous different ways, these units are not described in detail below, but on the figures it is assumed that the transmitting of the signals 15 takes place via cables. However, it should be mentioned that the control central 1 in turn may be controlled by meteorological data transmitted from a monitoring or controlling central 1 which first of all converts the metrological data into suitable activating signals 15 having correct timely course for such use.

During cold periods the control centre 1 will transmit an activating signal 15 to the communication exchange 3. This exchange will retransmit this activating signal 15 further to the local control system 9, and then to a remotely operated unit 4 therein, which then is operated according to the value of the activating signal 15. Now the exchange 5 within the control system 9 takes hand of several functions. First of all the central monitors the humidity in the ground or on the surface by means of the humidity sensor(s) 6. During relatively mild periods these values shall alone control the plant as the heating elements 8 will be supplied with power when humidity is present and the temperature at the same time is below a predetermined value, e.g. 0° C. During cold periods, e.g. when the temperature is below –2° C., while the humidity sensors 6 at the same time detect that the surface is quite dry, the previously known plant would be switched "on" to maintain a certain stand-by temperature in the ground. According to the present invention the heat will be switched "on" first when the meteorological data tell that precipitation and a low temperature are anticipated in a relatively near future. First then the exchange 5, controlled by the remote control unit 4, will be set to transmit power from the source 11 to the heating element 8 so that the surface temperature will start rising.

FIG. 2 shows the control plant for a more sophisticated regional heating plant according to the invention, and the same reference numerals as used above are used wherever found expedient. However, the plant is here designed in such a manner that the regional control system 10 is used as a reference plant, also referred to as a regional weather station 10. This "weather station" is provided with a further transmitter or a modem 2 added to the equipment shown in FIG. 1, and the further transmitter sends an activating signal 16 to satellite stations 7 having a simpler equipment. The function will then substantially be the same as in the system described above according to FIG. 1; but simultaneously with the energy transmitted from the power source 11 to the heating element(s) 8 in the local station the central 5 starts transmitting or re-transmitting the activating signal, referred to as 16, in the direction backwards toward the communication exchange 3. And the communication exchange 3 retransmits these activating signal 16 to one or more satellite stations 7, which may have a far simpler design, as explained below with reference to FIG. 4.

The transmission of the activity signals 15,16 may take place via a common or via different cables/channels.

FIG. 3 shows a possible design of the exchange 5 according to FIG. 1 and FIG. 2 more in detail. The exchange may be based on a SNØOSTAT from Jan Grosch AS, e.g. comprising a temperature sensor and/or a humidity meter. The SNØOSTAT may be reconstructed by removing the relay II (assumed on the FIG. 3 by broken connections) and include a remote control unit 4 comprising a remote switch in such a manner that the humidity meter will be shunted by the remote operated switch. This switch is operated by the activating signal 15. By closing the remotely operated switch the humidity sensor 6 will be overruled and the heating element 8 will be switched "on" even when humidity is not present, and this situation will occur as soon as a snowfall is predicted.

To describe the working of a plant according to the present invention two different working conditions will be considered below:

1) Low Temperature in the Ground (E.G. t<–2° C.)

When meteorological forecasts tell that precipitation is anticipated the control central 1 is programmed to transmit an activating signal 15 via modem 2 to the communication exchange 3 at a certain moment. This moment is preferably determined both by forecasts of expected precipitation and by the temperature during the last hours before such a forecast was stated. To understand the principle for determining this switching moment, it may be mentioned that if there have been a strong cold period for a while and snowfall is anticipated, the heating has to be switched "on" well before the precipitation falls, so that the ground will be heated from the temperature in the surroundings to an acceptable standby temperature before the snow begins to fall. Then it will be a short period only, or may be no period at all, with slush in the area At the same time the effect is that power is not used unnecessarily to heat the surface during long periods without precipitation.

The activating signal 15 causes that the heat of the plant is switched "on", and this signal may consist of a wireless signal or may be transmitted via cable, e.g. via a telephone network or via the ordinary mains network and then superimposed on the prevailing alternating current. The signal may be transmitted to the weather station 10 adapted to control a switch connected in parallel to the humidity sensor 6 in the exchange 5 by means of a remotely operated unit 4. In this manner the shunted humidity sensor will affect the automatic circuit in such a manner that the heat will be switched "on" as the circuit is made to believe that the precipitation already has started.

The power may be switched "off" in the following manner:

A while after the point of time at which the snowfall should have started, e.g. some hours thereafter, a new activating signal 15 (or passivating signal) is transmitted from the control central 1 via the modem 2 to the communication exchange 3 and retransmitted to the remotely controlled unit 4 provided with a remotely operated switch, to decouple the short circuiting over the input terminal of the humidity sensor 6, so that this sensor does not any longer indicate humidity if not real humidity exists on the sensor.

If the sensor is dry or when it becomes dry, the exchange 5 will transmit a signal 16 to switch "off" the heat in satellite station 7. This signal is transmitted via the modem 2 and also via the telecommunication network and finally via the communication exchange 3. In this working condition the meteorological anticipations of precipitation and cold weather will result in switching "on" the heating plant, while this heating will :be turned "off" after a certain predetermined time if the precipitation did not some or has ceased.

2) A High Surface Temperature
(E. G. −2° C. <t>0° C.)

During periods with precipitation the exchange 5 in the weather station 10 will give a signal which will switch "on" the heating element 8. A signal is also transmitted to the modem 2 and via the telecommunication network to a communication exchange 3. The communication exchange 3 then will transmit a start signal to the satellite station(s) 7.

When the humidity detector 6 is dry the central 5 transmits a signal to switch "off" the heating element 8. This signal will also be sent to the modem 2 and via the telecommunication network the signal is being transmitted to the communication exchange 3 which then transmits a dis-connecting signal to the satellites 7. In this condition then the detector 6 in the weather station 10 will itself both start and stop the heating process.

If desired each single satellite station 7 may be controlled manually from the control central 1.

FIG. 4 shows the design of a very simple satellite station 7. Here the control is assumed to take place by a wireless transmission of signals to the aerial 12. The signals are received and treated in the remotely operated unit 4 which operates a remotely operated switch therein, and connects or disconnects the power source 11 to/from the heating element 8. The activating signal 16 is normally transmitted from the weather station 7 via its modem 2, but may also be transmitted directly from the control central 1. It should be mentioned that the heating plant may use any kind of inexpensive and accessible energy within the region. In Norway it is suitable to use electrical energy as water energy plants gives inexpensive electricity. The remotely operated unit 4 may then include an electric or electronic switch, or any kind of regulator previously known. In other countries and in other epochs other kinds of power may be used. Plants where the energy is supplied as a heated fluid may e.g. be assumed, and then the controllable element may be designed as a valve of "on"/"off" type or an adjust and remotely operated valve through which the fluid passes.

The new control system may be combined with different kinds of previously known control plants. Although the embodiments above refers to a combination of a remotely operated unit and a SNØOSTAT-unit from the above mentioned Norwegian firm, this does not exclude combination of the invention with other automatic plants.

Although the remotely operating process referred to in the embodiments comprises a remotely operated switch, this does not exclude use of a more sophisticated remotely operated element than such an "on"/"off" element. The remotely operated unit may e.g. include a stepwise regulating device, e.g. a previously known varistor or thyristor connection, often used as a dimmer for light sources, in which the supplied energy is electrical AC energy, and where the power output is varied by varying the circuit's duty cycle, or the output may include a step motor which in turn regulates a valve.

The very signal used for the remotely operating process will normally be a radio signal and this signal may be coded or predetermined in such a manner that only the desired receivers within reach of the signals will react.

The economical reason for such a control system may be that the increased building costs will be saved within short due to strongly reduced operating costs. In these days with a shortage of energy, economic use of the resources without pollution is important. In a country as Norway it should therefore not be underestimated that using such power saving plants may delay or make new, expensive erection of new power stations unnecessary.

It should also be mentioned that the invention may be used in such a way that the service itself, to switch a plant "on" and "off" at optimal time intervals, is the primary thing to be marketed. The result is that the operation will be both economic and advantageous as street heating plants will avoid long periods with slush on the heated area. The invention may also be used on existing plants as the equipment simply may be re-designed to obtain remotely operation. For existing plants of the type SNØOSTAT, the only change may be to set the thermostat measuring the ground temperature at so low a level that the thermostat will not be activated, and in addition a remotely operated switch may be added in the circuit in such a manner that the humidity meter will be shunted by the switch. Accordingly, the operation of the remotely operated switch will, by the circuit, be interpreted as if the ground is humid, and as a result the heating element(s) will be switched "on".

The object is to provide a control plant giving a shorter period with slush and saving considerably amounts of power during use, and also to offer services for controlling heating plants in such a manner that savings and advantageous operation is obtained.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed is:

1. A control system for at least one heating plant provided with heating element (8) and adapted for heating of one or several surfaces by power supply from a power source (11) for avoiding ice and snow generation on the surface(s), at a low power consumption, characterized in that the control system comprises:

a control central (1) adapted to obtain regional meteorological data and to transmit a predetermined activating signal (15) for activating the heating element via an existing communication network (2, 3) at a point of time depending on said data, a local control system (9,10) adapted to receive an activating signal (15) and provided with at least one remotely controlled unit (4) adapted to be effected by the activating signal (15); so that power supplied from a power source (11) to the heating element(s) (8) is changed dependent of the regional meteorological data.

2. A control system for a heating plant as stated in claim 1, characterized in that the control system (9,10) comprises an exchange (5) adapted to react on locally detected temperature and humidity values, detected by at least one local detector (6), and also to react on the received activating signal(s) (15).

3. A control system for a heating plant as stated in claim 1, and where the energy is supplied as electrical energy, characterized in that said remotely operated element comprises a controllable contractor (e.g. a thyristor or varistor controlled contractor) being able to supply the street surface with a variable amount of energy by varying the duty cycle of the working current.

4. A control system for at least one heating plant provided with heating element (8) and adapted for heating of one or several surfaces by power supply from a power source (11) for avoiding ice and snow generation on the surface(s), at a low power consumption, characterized in that the control system comprises:

a control central (1) adapted to obtain regional meteorological data and to transmit a predetermined activating signal (15) for activating the heating element via an existing communication network (2, 3) at a point of time depending on said data, a regional control system (9, 10) adapted to receive an activating signal (15) and provided with at least one remotely controlled unit (4) adapted to be effected by the activating signal (15); so that power supplied from a power source (11) to the heating element(s) (8) is changed dependent on the regional meteorological data.

5. A control system for at least one heating plant provided with heating element (8) and adapted for heating of one or several surfaces by power supply from a power source (11) for avoiding ice and snow generation on the surface(s), at a low power consumption, characterized in that the control system comprises:

a control central (1) adapted to obtain regional meteorological data and to transmit a predetermined activating signal (15) for activating the heating element via an existing communication network (2, 3) at a point of time depending on said data, a local/regional control system (9, 10) adapted to receive an activating signal (15) and provided with at least one remotely controlled unit (4) adapted to be effected by the activating signal (15); so that power supplied from a power source (11) to the heating element(s) (8) is changed dependent on the regional meteorological data, and an exchange (5) arranged as part of the local/regional control system and adapted to react on locally detected temperature and humidity values, detected by at least one local detector (6), and also to react on the received activating signal(s) (15).

6. A method for controlling a heating plant comprising at least one heating element (8) adapted for locally heating of a surface, at a low power consumption, to avoid ice or snow on the surface, characterized in that regional meteorological data are obtained, in particular related to regional temperature progress and anticipated regional precipitation, an activating signal (15) is transmitted at a point of time deduced from meteorological data, said activating signal (15) is further transmitted to at least one remotely operated unit (4) connected to the heating element(s) (8) and is operating these elements, and that the point of time for transmitting the activating signal (15,16) is determined in such a manner that the heating element(s) (8) is/are passivated during cold periods without precipitation, but all the same is/are activated at a certain adjustable point of time succeeding the point of time when precipitation is anticipated according to the regional meteorological data.

7. A method as stated in claim 6, characterized in that at least one of the heating elements (8) within the region also is/are controlled by at least one locally arranged humidity and/or temperature detector (6) registrating local humidity and/or local temperature close to the heating element(s) (8).

8. A method as stated in claim 7, used with a heating plant comprising several heating elements (8) distributed over one geographic region having substantially the equal meteorological conditions, characterized in that a reference plant (10) controlling at least one heating element (8) is selected as the only plant receiving the activating signal (15) directly and also being controlled by this signal within this region, while at least one different heating plant (7) within the same region is/are controlled by further remotely controlling signals (16) generated in or retransmitted from said reference plant (10).

9. A control system as stated in claim 8, characterized in that the system comprises several controllable heating elements (8) distributed over several separated heating plants distributed over a region with substantially equal weather conditions, that one of the heating plants within a region represents a regional weather station (10) acting as a reference plant and provided with a modem (14) adapted for transmitting a remotely operating signal (1) to the remaining satellite plants (7) within the region, while each satellite station (7) comprises a heating plant controlled only by an activating signal (16) from the regional weather station (10).

10. A method as claimed in claim 6, characterized in that the exact point of time for transmitting the activating signal (15) and thereby activating/passivating the heating element(s) (8), is adjusted in dependence of the regional temperature progress.

11. A method as stated in claim 6, characterized in that the activating signals (15) are based on information delivered by the public meteorological forecast services.

* * * * *